United States Patent [19]

Flach, deceased et al.

[11] Patent Number: 4,507,608
[45] Date of Patent: Mar. 26, 1985

[54] METHOD AND ARRANGEMENT USING A PAIR OF RESONANT CIRCUITS FOR DETERMINING AND INDICATING THE POSITION OF AN UNEVENESS IN THE INNER SURFACE OF PIPES OR OTHER TYPES OF CYLINDRICAL STRUCTURES

[75] Inventors: Jürgen Flach, deceased, late of Duesseldorf, Fed. Rep. of Germany, by Marlis Flach, executor; Rigobert Opitz, Hamburg, Fed. Rep. of Germany; Heinz Daugart, Nienhof, Fed. Rep. of Germany; Hans-Günter Baden, Munster, Fed. Rep. of Germany

[73] Assignee: Rheinmetall GmbH., Duesseldorf, Fed. Rep. of Germany

[21] Appl. No.: 356,794

[22] Filed: Mar. 10, 1982

[30] Foreign Application Priority Data

Mar. 12, 1981 [DE] Fed. Rep. of Germany ....... 3109445

[51] Int. Cl.³ ..................... G01N 27/82; G01R 27/26
[52] U.S. Cl. ................................ 324/220; 324/61 R; 324/237
[58] Field of Search ................................ 324/219–221, 324/236, 237, 232, 79 R, 79 D, 61 R, 61 P, 61 QS, 328; 331/65

[56] References Cited

U.S. PATENT DOCUMENTS

| | | | |
|---|---|---|---|
| 2,684,464 | 7/1954 | Hastings et al. | 324/220 |
| 2,963,644 | 12/1960 | Nuttall | 324/220 |
| 3,238,448 | 3/1966 | Wood et al. | 324/220 |
| 3,443,211 | 5/1969 | Wood et al. | 324/220 X |
| 3,460,034 | 8/1969 | Tanner | 324/79 |
| 3,543,145 | 11/1970 | Dufayet | 324/237 |
| 3,823,365 | 7/1974 | Anderson | 324/328 |
| 3,835,374 | 9/1974 | Frost | 324/220 |

OTHER PUBLICATIONS

Jupe, John H., Crack Detector for Production Testing *Electronics*, Oct. 1945, pp. 114, 115.

*Primary Examiner*—Gerard R. Strecker

[57] ABSTRACT

Method for determining the position and depth of unevenness in an inner surface of a pipe with the aid of a scanning head which is adapted to travel through the pipe and which is rotatable about the pipe axis. The invention provides an inductive, or capacitive, depth scanning process, which operates in a contact-free manner with respect to the inner pipe surface. This is attained by means of an inductive method in that, as is illustrated in the drawing, there is arranged at a distance from the pipe inner surface the scanning head which is guided and in which a coil (2) of a measuring, resonant circuit is mounted and, above the inner periphery of the pipe, a coil 1 of a reference, resonant circuit is arranged, and then, after the frequencies of both resonant circuits have been brought, prior to measuring, to an identical value in each of a multiplying circuit (10, 7, 13 respectively 11, 8, 14), they are measured and converted into an adjustable difference of the multiplied frequencies ($f_1$, $f_2$) in an analog-digital converter (18) and conducted to a microprocessor (19) as a signal with respect to the unevenness, and from there are conducted to an evaluation unit (20). With the capacitative depth scanning method, the frequency difference is attained by adjusting the capacity of the resonant circuits.

8 Claims, 4 Drawing Figures

METHOD AND ARRANGEMENT USING A PAIR OF RESONANT CIRCUITS FOR DETERMINING AND INDICATING THE POSITION OF AN UNEVENESS IN THE INNER SURFACE OF PIPES OR OTHER TYPES OF CYLINDRICAL STRUCTURES

BACKGROUND OF THE INVENTION

The invention relates to a method and arrangement for determining and indicating the position and depth of an unevenness of the inner surface of a pipe.

Such method is for example disclosed in German patent application No. P 30 03415, corresponding to U.S. patent application Ser. No. 230,050, filed Jan. 29, 1981, now U.S. Pat. No. 4,407,071, which process has the drawback that the mechanical scanning system comes into contact with the pipe wall. In view of the frictional forces that are encountered, errors in the measurements and even jamming of the feelers in imperfections or erosions of the interior surface of the pipe, can result. Due to the mechanical scanning, the period between two measurements is relatively long since the feeler finger must be lifted off the interior pipe wall, shifted in position and then again brought into contact with the pipe wall.

SUMMARY OF THE INVENTION

It is an object of this invention to avoid the aforedescribed drawbacks of the method and arrangement of the prior art by providing a scanning system which does not physically contact the inner pipe wall. Thereby the time for measuring is shortened and also the position of measurements in a slow-measuring procedure is considerably increased.

This object is obtained in a system in which a magnetic depth scanning method with inductive high frequency measurements is used and in the case of a capacitive depth scanning method, certain other features of the method of the invention are used. The method of the invention operates on the basis of the following principle:

When there is a washed out or eroded surface portion present on the inner pipe surface at a position which is confronting the measuring resonant circuit, then at this position the field of the magnetic force lines between the coil of the measuring resonant circuit and the pipe wall is changed, since in view of the different induction coefficient of metal and air which differ in order of magnitude, there results a change in the inductivity which leads to a measurable frequency shift. This frequency shift is a function of the change in depth, that is, a function of the distance of the wall surface from the coil, and can therefore be used for calculating the depth of the eroded and washed out wall surface portion by means of calculating factors.

In order to register the frequency change of the measuring resonant circuit, its oscillating frequency prior to the measurement is compared (adjusted) to the frequency of a reference resonant circuit. The reference swing circuit is mounted in the same scanning head. Both resonant circuits, for purposes of compensation prior to the beginning the measurements in the pipe, are arranged over an intact portion of the inner pipe surface in the immediate vicinity with respect to each other. The scanning head with both resonant circuits is displaceable in the direction of the longitudinal pipe axis and is swingable about this axis. The reference resonant circuit serves to maintain the inductance at an intact position of the inner surface of the pipe in the region of the measuring resonant circuit. The frequency of the reference resonant circuit is the frequency of a plurality of series connected reference coils (FIG. 3) disposed about the inner periphery of the pipe. This frequency serves as a basis for the determination of the difference of the frequency changes of both resonant circuits.

Due to the fact that the coils of the resonant circuits are maintained in the immediate vicinity of the scanning head, they avoid, on the one hand, eventual measurement errors due to different temperatures in the pipe at both scanning positions of the resonant circuit, and on the other hand, it is made thereby also possible, to measure pipe surfaces in pipes with different cross sections.

In accordance with the invention, there are used in the reference resonant circuit coils of identical construction, in order to avoid measuring mistakes as a result of temperature differences in the coils. It is for example possible to use 12 identical coils.

When the capacitative depth scanning method of the invention is used, then the frequency changes of the resonant circuits are generated, in lieu of the change of the inductivity, by means of the change of the capacity of the resonant circuits. The condenser surfaces of the scanning head are insulated from each other by being disposed at a mutual distance from each other. The disturbing capacity which appears is then evaluated as a constant magnitude.

DESCRIPTION OF THE DRAWING

The functioning of the method is described in conjunction with the attached drawing in which.

DESCRIPTION OF THE PREFERRED EMBODIMENT

Figure 1:
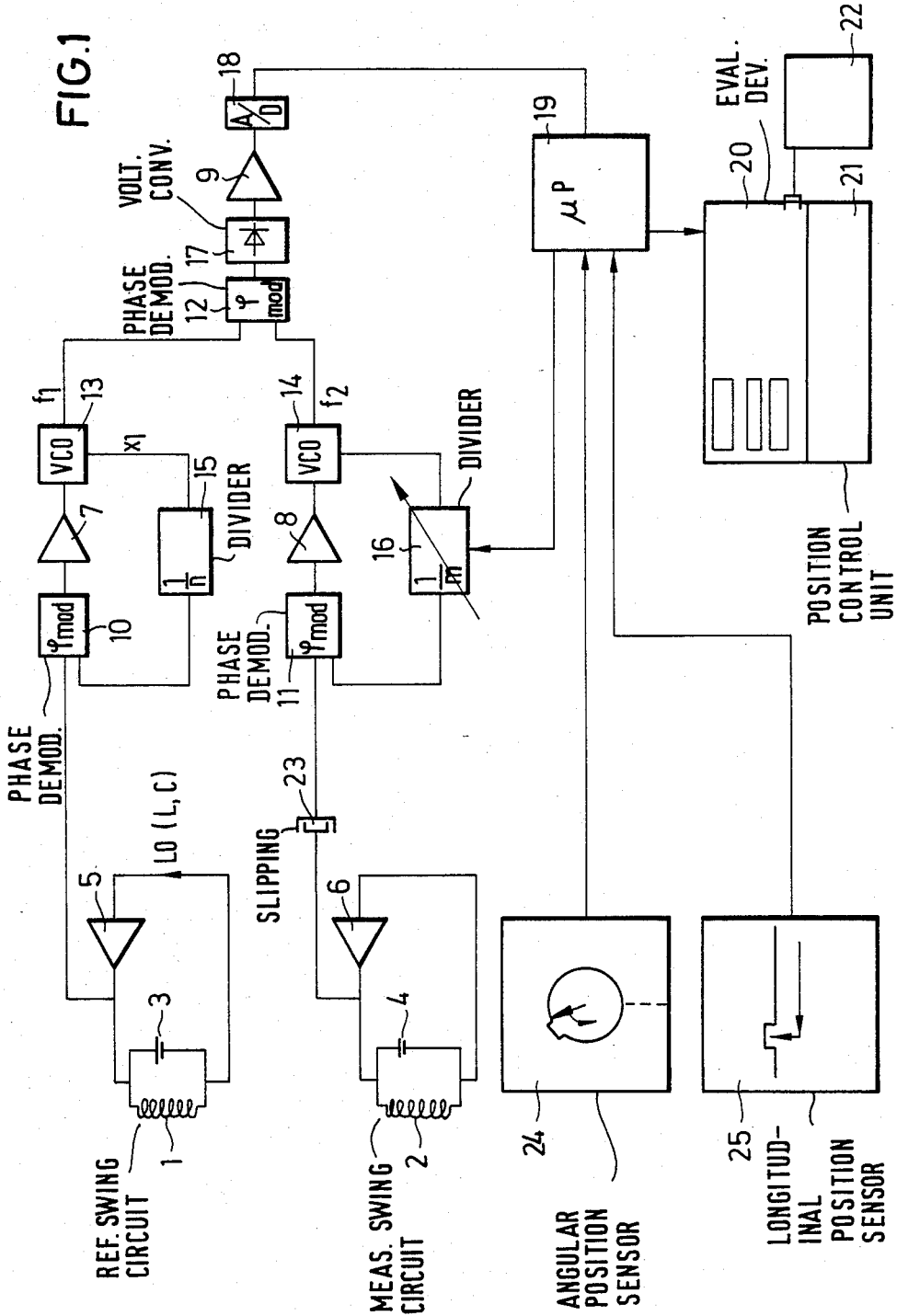
FIG. 1 is a circuit diagram of an inductive scanner in accordance with the invention.

A reference resonant circuit has a condenser 3 and a coil 1, while a measuring resonant circuit has a coil 2 and a condenser 4. In these resonant circuits there are provided return coupling amplifiers 5 and 6, respectively. The oscillating frequency of the reference resonant circuit may be, for example, 60 KHz which is increased by a subsequently connected frequency multiplying circuit (phase-locked loop), consisting of a phase demodulator 10, a return coupling amplifier 7, an oscillator 13 and a fixed frequency divider 15, to a predetermined higher frequency $f_1$ of 100 MHz.

The measuring resonant circuit has an oscillating frequency of, for example, 200 KHz which, in a subsequently connected and adjustable frequency multiplying circuit (phase-locked-loop), consisting of a phase demodulator 11, a return coupling amplifier 8, an oscillator 14 and an adjustable frequency divider 16, is adjusted, prior to beginning the measurement, to a frequency $f_2$ of 100 MHz, the same value as $f_1$.

The frequency of both resonant circuits can therefore be differentiated in order to optimize the resonant circuit values of the different resonant circuits, because as a result of differences in individual coils and differences in capacities, identical oscillating frequencies cannot be expected. The conversion of the oscillating frequency into a very high frequency of, for example, 100 MHz is required because thereby the dividing relationship in the phase-locked loop becomes very large and, as close as possible, an approach of both frequencies is obtained, by which high position and improved resolution power is attained.

At the beginning of the measurement there is present at a demodulator 12 the frequencies $f_1$ and $f_2$ of the resonant circuits. These frequencies are compared in the demodulator 12. At a frequency change in the measuring resonant circuit, wherein vibrations representing phase shifts between both frequencies $f_1$ and $f_2$ form, there results a frequency difference. This difference is conducted in a form of a frequency to a voltage converter 17, amplified in an amplifier 9 and conducted in an analog-digital converter 18 as a frequency-phase-difference to a microprocessor 19. The frequency voltage converter 17 may under certain circumstances be replaced by a rectifier when regulation by means of phase differences is realized. In this respect adequate DC voltage for the analog-digital converter 18 is required.

There is already stored in the microprocessor 19 the compensation magnitude which results from a fine adjustment of the frequencies $f_1$, $f_2$. This magnitude and the frequency difference, which has been converted in the analog-digital converter 18, serve in the microprocessor 19 as criteria with respect to the depth of the unevenness of the pipe surface. A phase displacement of both resonant circuits also changes this frequency. This frequency is therefore taken into account in the process.

The drawing illustrates also an angular position sensor 24 and a longitudinal position sensor 25, which deliver their respective values to the microprocessor 19, which thereafter conducts the digital information with respect to depth measurement, rotation and longitudinal position to an evaluation device 20, from where it is conducted to a plotter, an XY-scribing instrument 22. There is provided a control unit 21 with which the scanning head can be reciprocally moved through the pipe and by means of which the scanning head can be rotated. A slip ring 23 is provided in the wire which leads from the measuring resonant circuit. There is also provided such a slip ring in the wire leading from the reference resonant circuit.

Figure 2:
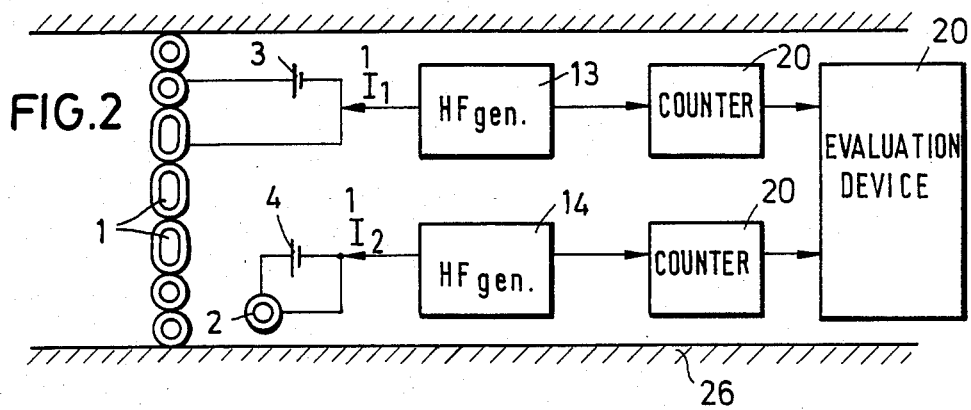
FIG. 2 is a longitudinal sectional view of pipe to be scanned in which the arrangement is mounted.
Figure 3:
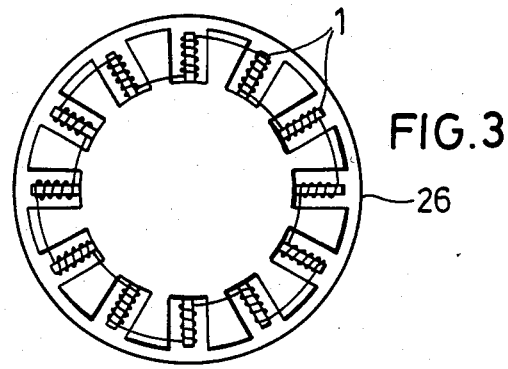
FIG. 3 is a cross-sectional view along line 3—3 of FIG. 2.

FIG. 2 illustrates in longitudinal section the inductive scanning system of the invention comprising twelve reference coils 1 and one measuring coil 2. Oscillators 14, 13 are illustrated by blocks as well as the evaluation devices.

Figure 4:
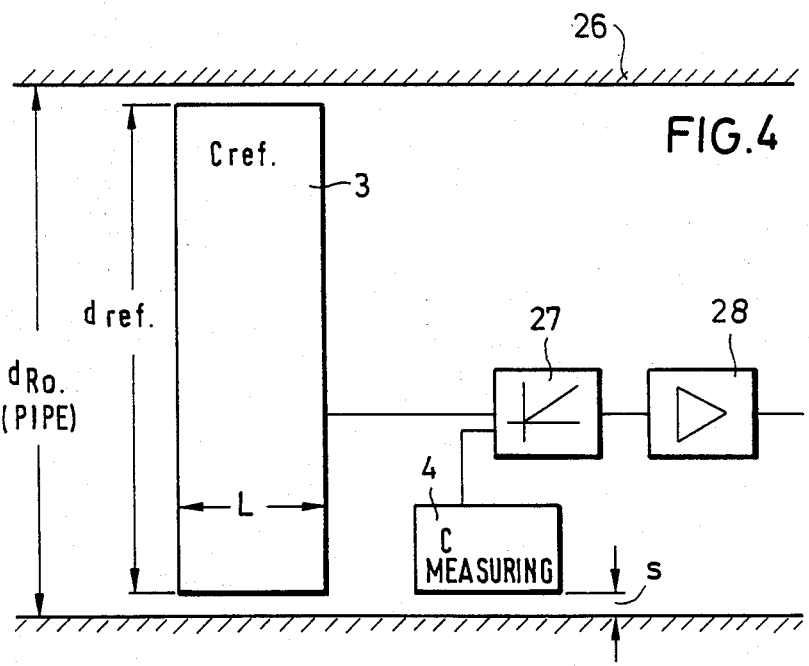
FIG. 4 illustrates in elevation the positions of the condensers 3, 4 of the reference resonant circuit and measuring swing circuit relative to the wall of the pipe. The circuits of FIG. 1 are illustrated by blocks 27, 28.

FIG. 4 illustrates the position of the condensers 3 and 4 relative to the pipe wall. Blocks 27, 28 represent the circuit of FIG. 1.

The frequency change in the measuring resonant circuit is attained by sliding the scanning head through the pipe. When the scanning head passes a washed out area of the pipe a frequency change occurs in the measuring resonant circuit. The frequency of the reference resonant circuit is not changed when the frequency of the measuring resonant circuit changes, but as has already been explained above, both frequencies can change due to ambient influences such as heat or reinforcing rings on the pipe. These changes are eliminated by the measurement. The changes of frequency in each resonant circuit is scanned in a conventional manner as can be noted from the state of the art. The order of magnitude of the measured frequency differences results, as compared to what is possible with state of the art equipment, from the multiple relationship of 60 Khz, 200 Khz and 100 Mhz.

We claim:

1. A method for determining and indicating the position and depth of unevenness in the inner surface of a pipe using a scanning head arranged to longitudinally traverse the pipe and which is rotatable about the pipe axis, the method comprising the steps:

providing said scanning head, on its outer periphery, with a first coil in a measuring resonant circuit having a resonant frequency;

providing said scanning head, on its outer periphery and in the immediate axial vicinity of said first coil, with a plurality of second coils, equidistant from each other, each of said second coils being at equal constant distance from the inner periphery of said pipe and being connected in series to form a reference resonant circuit having a resonant frequency;

increasing each of said resonant frequencies to an approximately equal multiple value of a higher frequency;

exactly matching the increased frequency of the measurement resonant circuit to the same value as the increased frequency of the reference resonant circuit;

moving said scanning head longitudinally and rotatably within said pipe whereby the entire inner surface thereof is scanned;

monitoring the longitudinal and angular position of said scanning head as said scanning head is traversed in said pipe;

comparing the values of said higher frequencies and measuring the difference therebetween while said scanning head is traversed in said pipe; and converting said differences into values of the depths of unevenness in the inner surface of said pipe.

2. An arrangement for determining and indicating the position and depth of unevenness in the inner surface of a pipe comprising:

a scanning head for insertion into said pipe;

a first coil in a measuring resonant circuit, having a resonant frequency, mounted to the outer periphery of said scanning head;

a plurality of second coils, equidistant from each other, each being an equal constant distance from the inner periphery of the pipe and in the immediate axial vicinity of the first coil, each of the second coils being connected in series to form a reference resonant circuit, having a resonant frequency, said second coils also mounted to the outer periphery of said scanning head;

means for increasing each of said resonant frequencies to an approximately equal multiple value of a higher frequency;

means for exactly matching the increased frequency of the measurement resonant circuit to the same value as the increased frequency of the reference resonant circuit;

means for moving said scanning head longitudinally and rotatably within said pipe;

means for measuring the angular and longitudinal positions of said scanning head;

means for comparing said higher frequency values and for determining the difference therebetween; and means for converting said differences into values of the depths of unevenness in the inner surface of said pipe.

3. An apparatus as claimed in claim 2 wherein said means for increasing the frequencies comprises a frequency multiplier, phase-locked-loop, circuit.

4. An apparatus as claimed in claim 2 wherein said means for exactly matching the frequencies comprises a compensation circuit having an adjustable frequency divider.

5. A method for determining and indicating the position and depth of unevenness in the inner surface of a pipe using a scanning head arranged to longitudinally traverse the pipe and which is rotatable about the pipe axis, the method comprising the steps:
   providing said scanning head, on its outer periphery, with a first condenser plate in a measuring resonant circuit having a resonant frequency;
   providing said scanning head, on its outer periphery and in the immediate axial vicinity of said first condenser plate, with a plurality of second condenser plates, equidistant from each other, each of said second condenser plates being at equal constant distance from the inner periphery of said pipe and being connected in series with a reference resonant circuit having a resonant frequency;
   increasing each of said resonant frequencies to an approximately equal multiple value of a higher frequency;
   exactly matching the increased frequency of the measurement resonant circuit to the same value as the increased frequency of the reference resonant circuit;
   moving said scanning head longitudinally and rotatably within said pipe whereby the entire inner surface thereof is scanned;
   monitoring the longitudinal and angular position of said scanning head as said scanning head is traversed in said pipe;
   comparing the values of said higher frequencies and measuring the differences therebetween while said scanning head is traversed in said pipe; and
   converting said differences into values of the depths of unevenness in the inner surface of said pipe.

6. An arrangement for determining and indicating the position and depth of unevenness in the inner surface of a pipe comprising:
   a scanning head for insertion into said pipe;
   a first condenser plate in a measuring resonant circuit, having a resonant frequency, mounted to the outer periphery of said scanning head;
   a plurality of second condenser plates, equidistant from each other, each being at equal constant distance from the inner periphery of the pipe and in the immediate axial vicinity of the first condenser plate, each of the second condenser plates being connected in series with a reference resonant circuit, having a resonant frequency, said second condenser plates also mounted to the outer periphery of said scanning head;
   means for increasing each of said resonant frequencies to an approximately equal multiple value of a higher frequency;
   means for exactly matching the increased frequency of the measurement resonant circuit to the same value as the increased frequency of the reference resonant circuit;
   means for moving said scanning head longitudinally and rotatably within said pipe;
   means for measuring the angular and longitudinal positions of said scanning head;
   means for comparing said higher frequency values and for determining the difference therebetween; and
   means for converting said differences into values of the depths of unevenness in the inner surface of said pipe.

7. An apparatus as claimed in claim 6 wherein said means for increasing the frequencies comprises a frequency multiplier, phase-locked-loop, circuit.

8. An apparatus as claimed in claim 6 wherein said means for exactly matching the frequencies comprises a compensation circuit having an adjustable frequency divider.

* * * * *